Sept. 18, 1928.

W. G. HUMPHREYS 1,684,705

VARIABLE SPEED MECHANISM

Filed May 13, 1926

Inventor

W.G.Humphreys

By Arthur H. Sturges

Attorney

Sept. 18, 1928.

W. G. HUMPHREYS 1,684,705

VARIABLE SPEED MECHANISM

Filed May 13, 1926    3 Sheets-Sheet 2

Inventor
W.G.Humphreys
By *Arthur H. Sturges*
Attorney

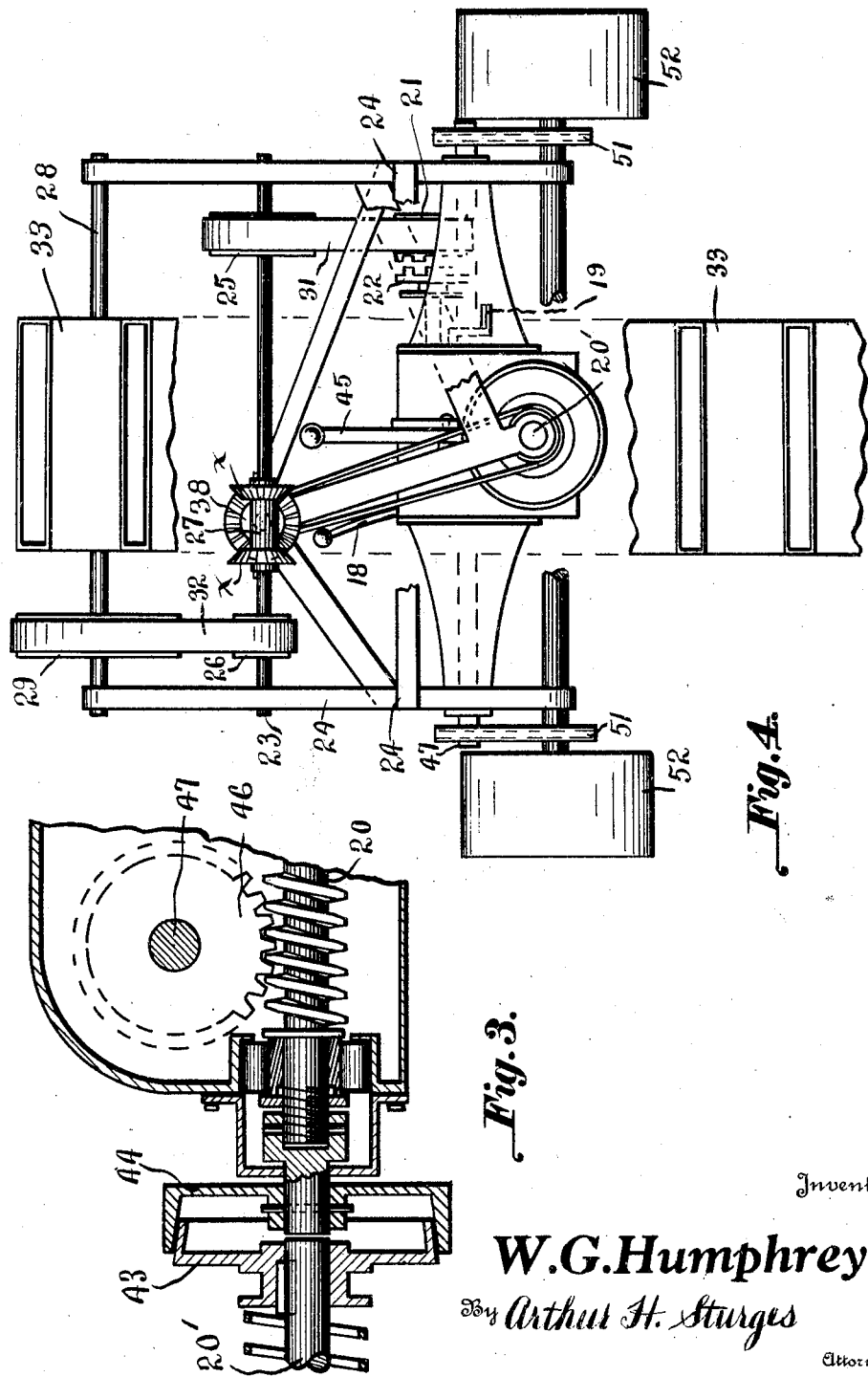

Patented Sept. 18, 1928.

1,684,705

UNITED STATES PATENT OFFICE.

WALTER G. HUMPHREYS, OF OMAHA, NEBRASKA.

VARIABLE-SPEED MECHANISM.

Application filed May 13, 1926. Serial No. 108,847.

This invention relates to variable speed mechanism useful for many purposes and particularly adapted for use in connection with vehicles equipped with excavating or trench digging mechanism, described in Letters Patent of the United States Nos. 1,419,381 and 1,419,382, dated June 13, 1922, the principal object being to permit the vehicle to be driven while the trench or excavation is formed, and to control the speed of the vehicle while the digging mechanism continues at normal speed.

In the operation of digging trenches the vehicle moves on the ground surface at the front of the trench, and since the ground may be rough or undulating, the time required in forming a trench will depend on its depth and density of the ground to be excavated and will not be uniform. The present invention provides means which may be conveniently controlled by an operator, whereby the vehicle may move at selected degrees of speed without disturbing the normal speed required for the excavating mechanism.

In preparing the accompanying drawings it has not been considered necessary to illustrate the digging mechanism described in the Letters Patent referred to, nor necessary to illustrate the operating parts of the engine of a tractor of conventional type, such as is provided for a Fordson tractor in connection with which the present invention is illustrated.

In the drawings:

Fig. 3 is an enlarged sectional detail view showing the worm shaft and its connections.

Fig. 4 is a broken away rear end view of parts shown in Fig. 1.

Figure 1:
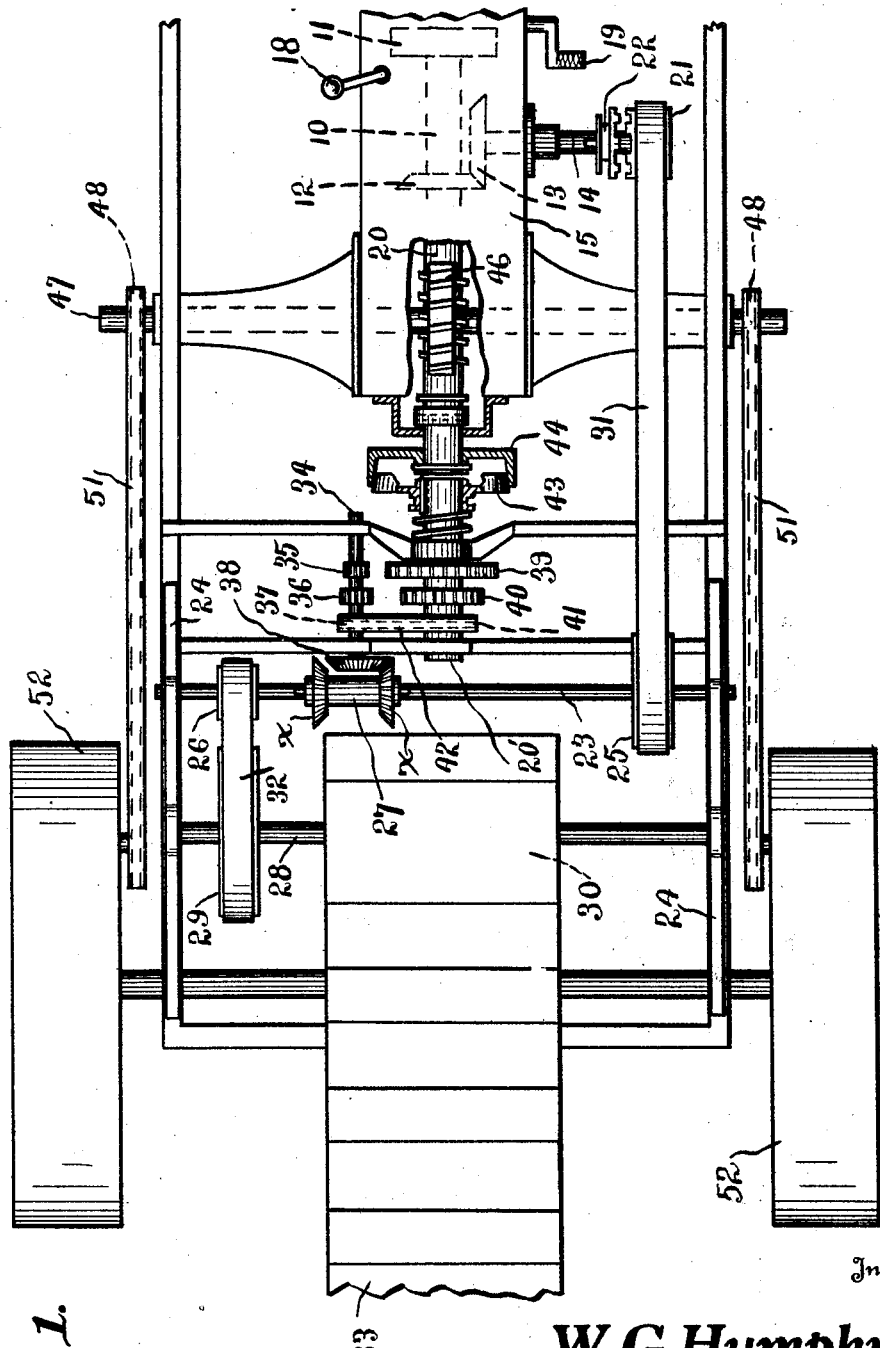
Fig. 1 is a plan view partly in section, showing the variable speed mechanism.

In the present instance the engine is provided with a shaft 10 adapted to be rotated by the engine crank-shaft (not shown), it being understood that a clutch 11 is provided and may be used for communicating rotation to said shaft 10 from the engine shaft. These parts are shown in dotted lines for the reason that they are in general use and are found on all Fordson tractors, other conventional parts consisting of a miter gear 12 adapted to engage the miter gear 13 carried by a driven shaft 14 which projects outwardly from the transmission housing 15 of the tractor at right-angles to said shaft 10.

Other parts include a spur-gear 16 mounted on said shaft 10 adapted to be placed in engagement, selectively, with a gear wheel 17 having a mounting on a worm shaft 20, these parts being designated usually as transmission mechanism and common to tractors.

Other conventional parts include a gear shift lever 18, by means of which an operator, at desired times, may cause the spur-gears 16 and 17 to become engaged. Numeral 19 indicates a clutch pedal, by means of which, an operator may cause the clutch 11 to function.

It will be understood that the drive shaft 14 is generally found on tractors of the class described, and may be used for various purposes. While none of the parts thus mentioned are claimed as new, the present invention includes certain mechanism used in connection with the driver shaft 14.

By the use of the shaft 14 the vehicle may be propelled whenever desired, its movements being as slow as may be required, this being of great advantage in instances where the trench has a considerable depth, or the earth to be excavated is more dense or hard than usual, certain mechanism to be described, being employed for this purpose.

When moving the vehicle upon a highway or from one location to another, an operator may cause the rotary motion of the engine shaft to be communicated directly to the worm shaft 20 by causing engagement of the gears 16 and 17, the clutch members 43 and 44 being disconnected at this time.

To cause the slow or creeping movement of the vehicle mentioned, an operator may place the gear shift lever 18 in neutral position, whereby the gear wheels 16 and 17 will not be in engagement, the drive shaft 14 however being rotated by the rotation of shaft 10, said shaft 10 being rotated on account of the engine shaft when the latter is coupled with the shaft 10 by means of the clutch 11.

It will therefore be noted that power derived from the rotation of the engine shaft may be applied directly to the worm shaft 20 or may be applied as described, for rotating the shaft 14.

In order that the objects may be attained as first mentioned, certain mechanism is provided and now to be described, consisting in part, of an idler pulley 21 mounted on the drive shaft 14 at its outer end and adapted to be rotated by said shaft by means of a clutch 22 which is splined upon and is movable or slidable on this shaft.

Numeral 23 indicates an operating shaft which is disposed transversely of the vehicle and has bearings in a suitable frame 24 which extends above the body of the vehicle, said shaft 23 being provided with wheels 25 and 26 and having an alternating gear sleeve 27 splined thereon.

Numeral 28 indicates and auxiliary shaft having bearings in the frame 24 and provided with wheels 29 and 30. At 31 is indicated a belt engaging the wheels 21 and 25, and at 32 is indicated a belt adapted to engage the wheels 26 and 29, the parts mentioned being adapted to move the flexible endless excavator belt 33 which is mounted on the wheel 30 of the auxiliary shaft.

While the elements 31 and 32 have been designated as belts for engaging the wheels mentioned, sprocket chains or other gearings could be used, but since the ground to be excavated is not always free from rocks or other obstructions, belts are preferred, to prevent injury to the mechanism, and the parts thus mentioned may have any suitable proportions corresponding to the degree of rotation of the shaft 14 for excavating, or for other purposes including the formation of trenches.

In order that the vehicle may move slowly and may be moved at selected degrees of speed, a stub shaft 34 in suitable bearings is provided with a suitable number of sprocket wheels differing in diameter, indicated at 35, 36 and 37 and having a miter gear 38 for engaging the alternating gear 27 of the operating shaft.

Numerals 39, 40 and 41 indicate sprocket wheels differing in diameter carried by the extension 20' of the worm shaft 20, a sprocket chain 42 being in engagement with the wheels 37 and 41. As described a rotation of the shaft 23 will cause a rotation of the stub shaft 34 for rotating the extension 20' of the worm shaft. Numeral 43 indicates a clutch-member which is splined on the extension 20' normally pressed into engagement with a clutch-member 44 carried by the worm shaft but under control of a hand lever 45, and, as is obvious when the clutch members are in engagement the worm shaft will be rotated for actuating the worm wheel 46, the latter being mounted on the propeller shaft 47, having suitable bearings, and provided at its ends with sprocket wheels 48. The vehicle wheels 49 at the respective sides of the vehicle body are provided wth sprocket wheels 50, and sprocket chains 51 communicate the rotatable movements of the wheels 48 to the wheels 50 for rotating the vehicle wheels 49.

It will be understood that the sprocket chain 42 may be removed from the wheels 37 and 41, and that sprocket chains of greater length may be used and that the wheels 36 and 40 may be engaged by a chain, or the wheels 35 and 39 may be engaged by a chain, and by the means described the vehicle may have the desired slow or creeping movements mentioned.

It will be noted that the means employed for controlling the speed of the vehicle as outlined will not change the speed of the operating parts of the excavating mechanism. The shafts 14, 23 and 28 may rotate at a normal high degree of speed while the shaft 47 and vehicle wheels 49 rotate at reduced degrees of speed.

Figure 2:
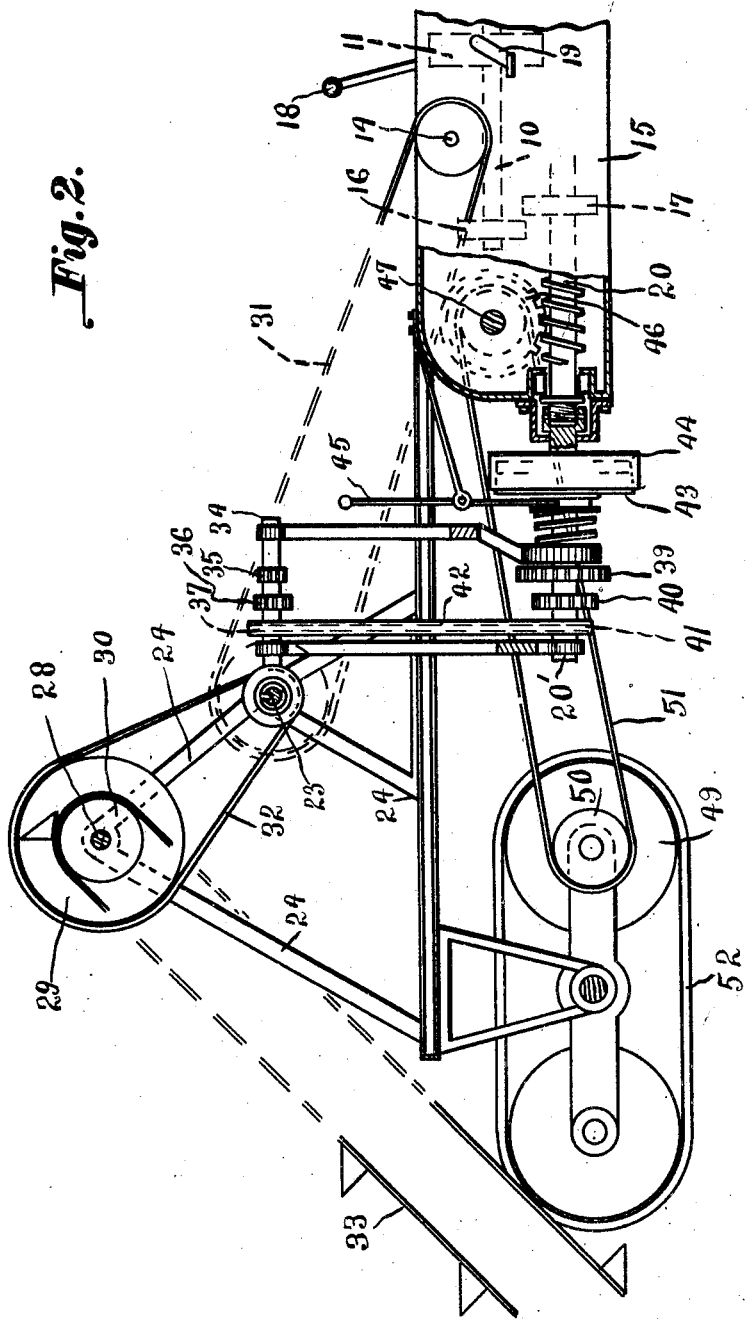
Fig. 2 is a view of the same in longitudinal section.

While I have shown in Fig. 2 of the drawings that vehicle wheels 49 are used in pairs and are engaged by endless belts 52 which engage the ground, this feature is not important, and while the construction shown is preferred, I may use other kinds of vehicle wheels if desired.

One of the advantages to be derived by use of the alternating gear sleeve 27 is that it may be moved on the shaft 23 to cause the miter gear 38 of the stub shaft 34 to engage one of the miter gears X of the gear sleeve to reverse the movement of the vehicle, since in some instances a rearward movement is desirable.

As already stated, an operator, by causing engagement of the gears 16 and 17 may cause actuation of the worm shaft direct from the engine shaft, and if the worm shaft 20 is not coupled with the worm-shaft extension 20' the actuating shaft 47 may have a high degree of rotation for moving the vehicle, the extension 20' not being rotated.

Also if the worm-shaft is coupled with its extension 20' by means of the clutch members 43 and 44, the clutch 22 being disengaged from the pulley 21, extension 20' may be rotated, together with the shafts 34, 23 and 28 for moving the excavator-belt 33, it being understood that the sprocket wheels 35, 36 and 37 for the shaft 34 and the sprocket wheels 39, 40 and 41 for the extension 20' may have any required diameters to effect a suitable degree of speed.

I claim as my invention:—

1. In driving mechanism for a vehicle, a frame, a drive shaft mounted transversely in the frame, a transverse propeller shaft, a transverse operating shaft spaced from the propeller shaft and exposed for connection with devices to be power driven, a longitudinally disposed shaft connected to the propeller shaft, a stub shaft disposed in parallel relation to the longitudinal shaft, registering gear sets on the stub and longitudinal shafts, a chain selectively connecting gears of said sets to drive through said shafts at the desired ratio, gearing connecting the stub and operating shafts, and a connection between the operating and drive shafts.

2. In driving mechanism for a vehicle, the combination with the usual propeller shaft, power shaft and disengageable gearing therebetween, a drive shaft connected to the power shaft in advance of said gearing, an operating shaft connected through a clutch to said drive shaft, a stub shaft reversibly connected to the operating shaft, another shaft disposed in parallel relation with the stub shaft, registering variable speed gears on the stub and said last named shafts, a shiftable connection between said gears for connecting the respective shafts in various ratios, and a clutch connection between said last named shaft and the propeller shaft.

In testimony whereof, I have affixed my signature.

WALTER G. HUMPHREYS.